United States Patent
Otani

(10) Patent No.: US 10,003,708 B2
(45) Date of Patent: Jun. 19, 2018

(54) IMAGE PROCESSING DEVICE AND IMAGE FORMING APPARATUS THAT GENERATES A LINE SYNCHRONIZATION SIGNAL BASED ON A MODULATION CLOCK AND WITH A VARIABLE LINE CYCLE

(71) Applicant: KYOCERA Document Solutions Inc., Osaka-shi, Osaka (JP)

(72) Inventor: Akizo Otani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/472,128

(22) Filed: Mar. 28, 2017

(65) Prior Publication Data
US 2017/0289398 A1    Oct. 5, 2017

(30) Foreign Application Priority Data

Mar. 31, 2016    (JP) ................ 2016-073044

(51) Int. Cl.
*H04N 1/00*    (2006.01)
*H04N 1/03*    (2006.01)
*H04N 1/047*    (2006.01)
*H04N 1/193*    (2006.01)
(Continued)

(52) U.S. Cl.
CPC ..... *H04N 1/00933* (2013.01); *H04N 1/00994* (2013.01); *H04N 1/03* (2013.01); *H04N 1/0473* (2013.01); *H04N 1/193* (2013.01); *H04N 1/409* (2013.01); *H04N 1/40056* (2013.01);
(Continued)

(58) Field of Classification Search
CPC ........... H04N 1/00931; H04N 1/00933; H04N 1/00994; H04N 1/047; H04N 1/0473; H04N 1/053; H04N 1/193; H04N 1/40056; H04N 1/401; H04N 5/3577; H04N 5/3765; H04N 2201/0081; H04N 2201/04767;
(Continued)

(56) References Cited

U.S. PATENT DOCUMENTS 6,493,830 B2 * 12/2002 Kamei ................. H04N 5/3577
                                                         348/E5.079
7,948,661 B2 *  5/2011 Tsukahara .......... H04N 1/40056
                                                              358/1.1
(Continued)

FOREIGN PATENT DOCUMENTS

JP    2002281252 A    9/2002

*Primary Examiner* — Scott A Rogers
(74) *Attorney, Agent, or Firm* — Alleman Hall Creasman & Tuttle LLP

(57) ABSTRACT

An image processing device includes a modulation clock generator, a line synchronization signal generator, a line image sensor, and an image processor. The modulation clock generator is configured to generate the modulation clock by modulating a frequency of a reference clock at a predetermined modulation cycle. The line synchronization signal generator is configured to generate, on the basis of the modulation clock, a line synchronization signal whose line cycle varies from line to line. The line image sensor is configured to sequentially read an image of one line of a document at a timing corresponding to the line synchronization signal and to output image data. The image processor is configured to process the image data on the basis of the modulation clock.

7 Claims, 7 Drawing Sheets

(51) Int. Cl.
*H04N 1/40* (2006.01)
*H04N 1/409* (2006.01)

(52) U.S. Cl.
CPC .............. *H04N 2201/0081* (2013.01); *H04N 2201/04772* (2013.01); *H04N 2201/04774* (2013.01)

(58) Field of Classification Search
CPC .......... H04N 2201/04768; H04N 2201/04772; H04N 2201/04774
See application file for complete search history.

(56) References Cited

U.S. PATENT DOCUMENTS

| | | | | |
|---|---|---|---|---|
| 8,135,103 | B1 * | 3/2012 | Courcy | H03L 7/197 |
| | | | | 348/537 |
| 8,149,468 | B2 * | 4/2012 | Okamoto | H04N 1/00933 |
| | | | | 358/409 |
| 8,427,715 | B2 * | 4/2013 | Yoshigae | H04N 5/243 |
| | | | | 358/1.1 |
| 8,659,766 | B2 * | 2/2014 | Aoyama | H04N 1/053 |
| | | | | 358/1.13 |
| 2004/0013321 | A1 | 1/2004 | Ohkawa | |
| 2006/0044629 | A1 * | 3/2006 | Kono | H04N 5/335 |
| | | | | 358/483 |
| 2011/0063693 | A1 * | 3/2011 | Yoshigae | H04N 1/40056 |
| | | | | 358/474 |

\* cited by examiner

IMAGE PROCESSING DEVICE AND IMAGE FORMING APPARATUS THAT GENERATES A LINE SYNCHRONIZATION SIGNAL BASED ON A MODULATION CLOCK AND WITH A VARIABLE LINE CYCLE

INCORPORATION BY REFERENCE

This application is based upon and claims the benefit of priority from the corresponding Japanese Patent Application No. 2016-073044 filed on Mar. 31, 2016, the entire contents of which are incorporated herein by reference.

BACKGROUND

The present disclosure relates to an image processing device including an image sensor, and an image forming apparatus.

In an image processing device including a line image sensor such as a CCD (Charge Coupled Device), a spread spectrum clock generator (SSCG) that generates a modulation clock by modulating the frequency of a reference clock at a predetermined modulation cycle is occasionally used in order to reduce unnecessary electromagnetic interference (EMI).

However, it is known that, in the case where image data that is outputted from the line image sensor is processed on the basis of the modulation clock, density variations synchronized with the modulation cycle of the modulation clock occur in the image data. Then, depending on the relationship between the line cycle at which the image of each line is read from a document by the line image sensor and the modulation cycle of the modulation clock, a striped or band-shaped noise caused by the density variations may be visually recognized in the image data.

Therefore, in order to reduce an apparent noise resulting from the density variations as described above, an image processing device is available in which the line cycle is set so as to be an integer multiple of the modulation cycle.

SUMMARY

An image processing device according to an aspect of the present disclosure includes a modulation clock generator, a line synchronization signal generator, a line image sensor, and an image processor. The modulation clock generator is configured to generate the modulation clock by modulating a frequency of a reference clock at a predetermined modulation cycle. The line synchronization signal generator is configured to generate, on the basis of the modulation clock, a line synchronization signal whose line cycle varies from line to line. The line image sensor is configured to sequentially read an image of one line of a document at a timing corresponding to the line synchronization signal and to output image data. The image processor is configured to process the image data on the basis of the modulation clock.

An image forming apparatus according to another aspect of the present disclosure includes the above-described image processing device and an image forming unit. The image forming unit is configured to form an image on a sheet on the basis of the image data that is processed by the image processor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 11 is a diagram for illustrating an effect of the sub-scanning direction correction process in the image forming apparatus according to an embodiment of the present disclosure.

DETAILED DESCRIPTION

Figure 1:
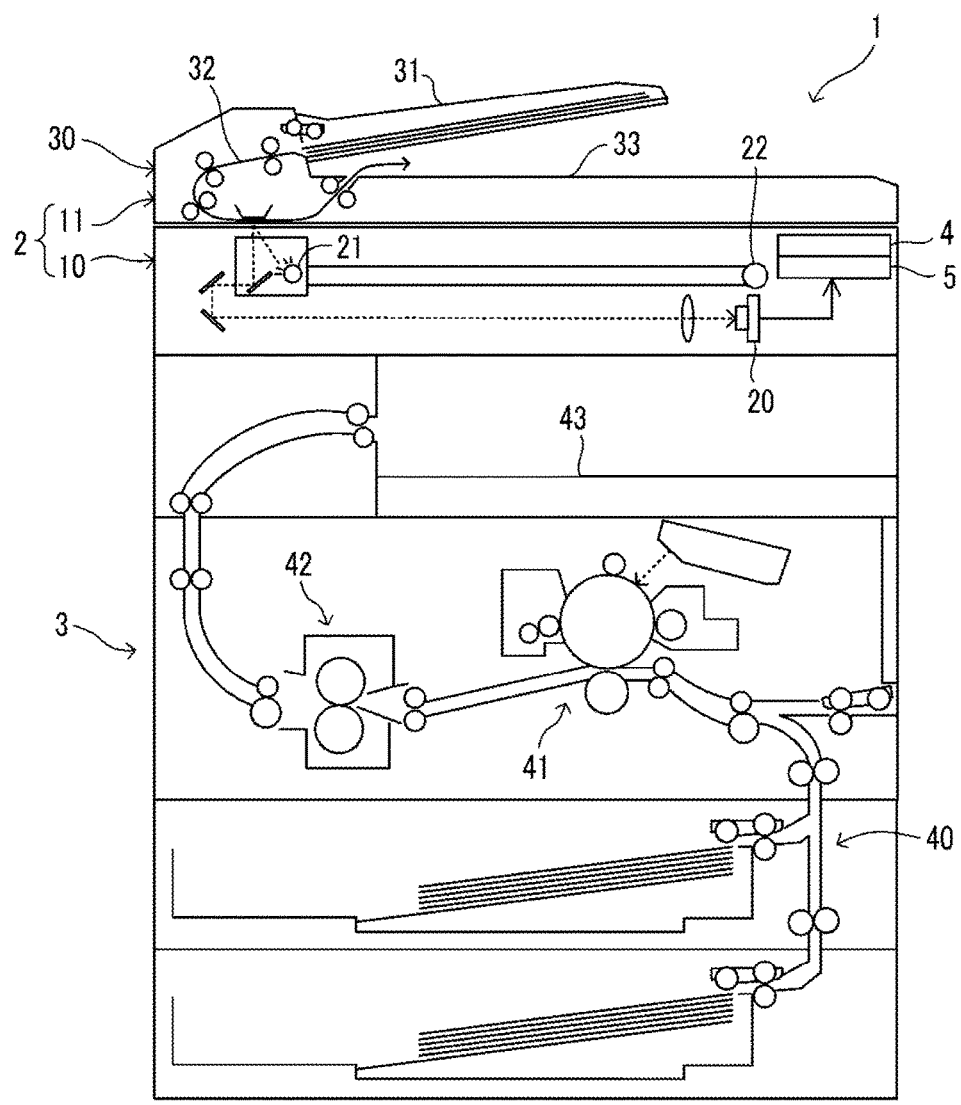
FIG. 1 is a diagram showing the configuration of an image forming apparatus according to an embodiment of the present disclosure.

Hereinafter, an embodiment of the present disclosure will be described with reference to the accompanying drawings. It should be appreciated that the embodiment described below represents an exemplary implementation of the present disclosure, and is not intended to limit the technical scope of the present disclosure.

[Outline of Image Forming Apparatus]

First, an outline of an image forming apparatus 1 according to an embodiment of the present disclosure will be described with reference to FIG. 1.

The image forming apparatus 1 includes an image reading unit 2 and an image forming unit 3. The image reading unit 2 is an example of the image processing device of the present disclosure. Additionally, the image forming apparatus 1 also includes an operation display 4 and a controller 5 that are components common to the image reading unit 2 and the image forming unit 3. The controller 5 performs controls for various devices and other types of data processing in the image reading unit 2 and the image forming unit 3.

The image reading unit 2 includes a document scanner 10 and a document table cover 11. The document table cover 11 is pivotably supported with respect to the document scanning unit 10. The document scanning unit 10 includes a transparent contact glass, and the document table cover 11 covers the upper surface of the contact glass.

The document scanning unit 10 includes a line image sensor 20, a light-emitting unit 21, an optical system movement mechanism 22, a plurality of mirrors, a lens, and so forth.

The line image sensor 20 sequentially reads an image of one line of a document at a timing corresponding to a line synchronization signal that is inputted, and outputs analog image data. Although a CCD image sensor is used as the line image sensor 20 in the present embodiment, another type of image sensor such as a CIS (Contact Image Sensor) may also be used. The image data that is outputted from the line image sensor 20 is supplied to the controller 5, and is subjected to various types of image processing in the controller 5.

The light-emitting unit 21 is a light source such as an LED array that emits light to the document. The light-emitting unit 21 is formed so as to extend in a main scanning direction (the direction perpendicular the plane of paper in FIG. 1), and illuminates a linear region extending in the main scanning direction on the document. The light reflected from the document is guided through the plurality of mirrors and the lens to the line image sensor 20.

The optical system movement mechanism 22 is a mechanism for moving the light-emitting unit 21 and some of the mirrors in a sub-scanning direction (the left-right direction in FIG. 1). By the light-emitting unit 21 moving in the sub-scanning direction at a constant speed in a state where the document is placed on the contact glass, the reading position (the linear region) on the document that is read by the line image sensor 20 moves in the sub-scanning direction at a constant speed.

An ADF 30 is incorporated in the document table cover 11. The ADF 30 conveys the document that is set on a document feed tray 31 sheet by sheet along a document conveyance path 32, and discharges the document onto a document discharge tray 33. A part of the document conveyance path 32 opposes the contact glass. Accordingly, as a result of the document being conveyed along the document conveyance path 32 at a constant speed in a state where the light-emitting unit 21 is fixed at a predetermined position, the reading position (the linear region) on the document that is read by the line image sensor 20 moves in the sub-scanning direction at a constant speed.

The image forming unit 3 includes a sheet feeder 40, a transfer unit 41, a fixing unit 42, and so forth. Although the image forming unit 3 in the present embodiment uses an electrophotographic method, it is possible to use another method such as an inkjet method.

The transfer unit 41 transfers, onto a sheet fed from the sheet feeder 40, a toner image formed on the basis of image data.

The fixing unit 42 heats and pressurizes the sheet on which the toner image has been formed, to fix the image onto the sheet. The sheet onto which the image has been fixed is discharged onto a sheet discharge tray 43.

The operation display 4 serves as an operation input unit including, for example, a touch panel and an operation button, and the like, and also serves as a display including a liquid crystal display panel and a notification lamp, and the like.

The controller 5 controls the image reading unit 2 and the image forming unit 3 on the basis of a user instruction that is inputted through the operation display 4, and the results of detections by various sensors. For example, when a copy instruction from the user is inputted through the operation display 4, the controller 5 controls the image reading unit 2 to read an image of the document and to generate image data, and also controls the image forming unit 3 to form an image on a sheet on the basis of the image data.

[Details of Image Reading Control Unit]

Figure 2:
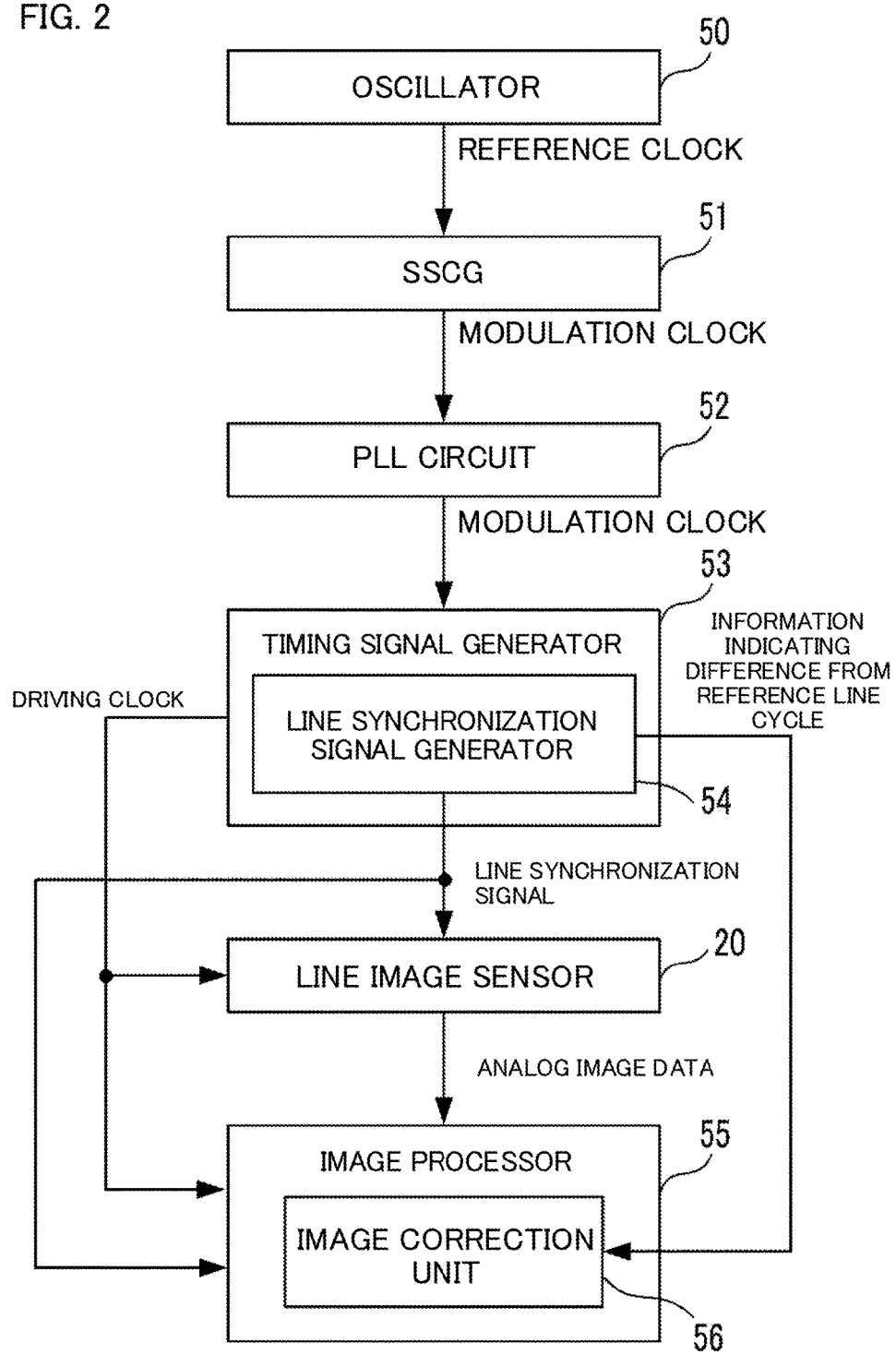
FIG. 2 is a block diagram of an image reading controller of the image forming apparatus according to an embodiment of the present disclosure.

Next, the image reading controller in the image forming apparatus 1 will be described with reference to FIG. 2. The image reading controller includes an oscillator 50, an SSCG 51, a PLL circuit 52, a timing signal generator 53, a line image sensor 20, and an image processor 55. The image reading controller may be included in the controller 5, or may be provided separately from the controllers.

The oscillator 50 outputs a reference clock having a constant cycle. The SSCG 51 generates a modulation clock by performing spread spectrum modulation on the frequency of the reference clock at a predetermined modulation cycle. The SSCG 51 is an example of the modulation clock generator of the present disclosure. The modulation clock is stabilized by the PLL circuit 52, and is supplied to the timing signal generator 53.

The timing signal generator 53 generates, on the basis of the modulation clock, a driving clock for operating the line image sensor 20 and the image processor 55, and various timing signals such as a line synchronization signal indicating the timing at which the image of each line of the document is read by the line image sensor 20.

Figure 3:
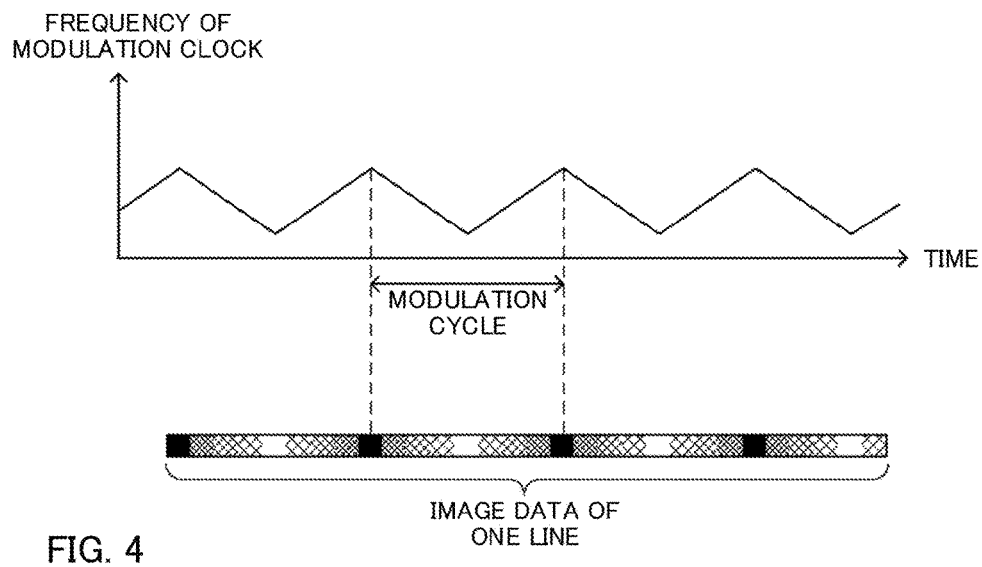
FIG. 3 is a diagram showing density changes of image data based on a modulation clock.

Meanwhile, it is known that, in the case where the image data that is outputted from the line image sensor 20 is processed on the basis of the modulation clock, density variations synchronized with the modulation cycle of the modulation clock occur in the image data, as shown in FIG. 3. Then, depending on the relationship between the line cycle at which the image of each line is read from the document by the line image sensor 20 and the modulation cycle of the modulation clock, a striped or band-shaped noise caused by the density variations may be visually recognized in the image data.

Figure 4:
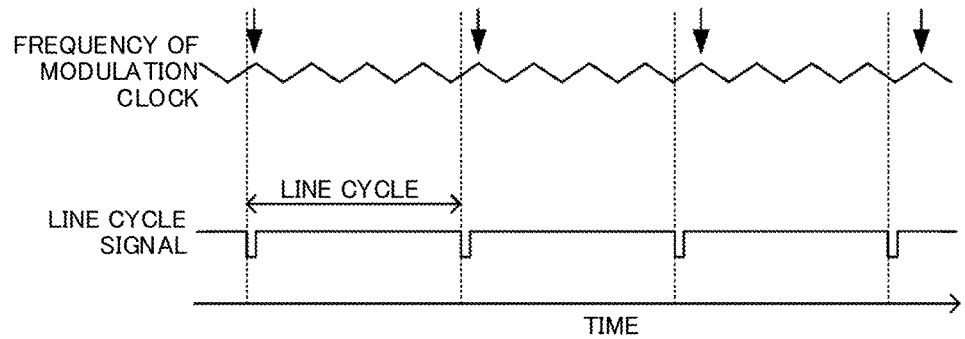
FIG. 4 is a diagram showing a relationship between the frequency of a modulation clock and a line cycle signal in the case where the line cycle is constant, as a comparative example of the image forming apparatus according to an embodiment of the present disclosure.
Figure 5:
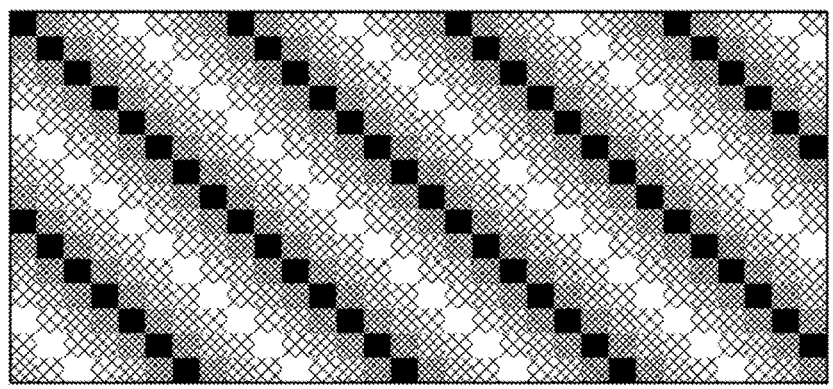
FIG. 5 is a diagram showing an example of image data in the case where the line cycle is constant, as a comparative example of the image forming apparatus according to an embodiment of the present disclosure.

For example, when the line cycle and the modulation cycle are both constant, the time period from the start of each line cycle until the appearance of the first peak of the frequency of the modulation clock increases by a constant time each time the line advances by one, as shown in FIG. 4. As a result, the peak positions of the density variations on the lines are arranged on straight lines, and are visually recognized as a striped or band-shaped noise, as shown in FIG. 5.

Therefore, an image processing device is also available in which the line cycle is set to be an integer multiple of the modulation cycle in order to reduce the apparent noise resulting from the density variations as described above. However, in the case of setting the line cycle so as to be an integer multiple of the modulation cycle, the line cycle or the modulation cycle cannot be freely set separately. Accordingly, for example, the line cycle becomes unnecessarily long, resulting in the problem of a drop in the image reading speed.

Figure 6:
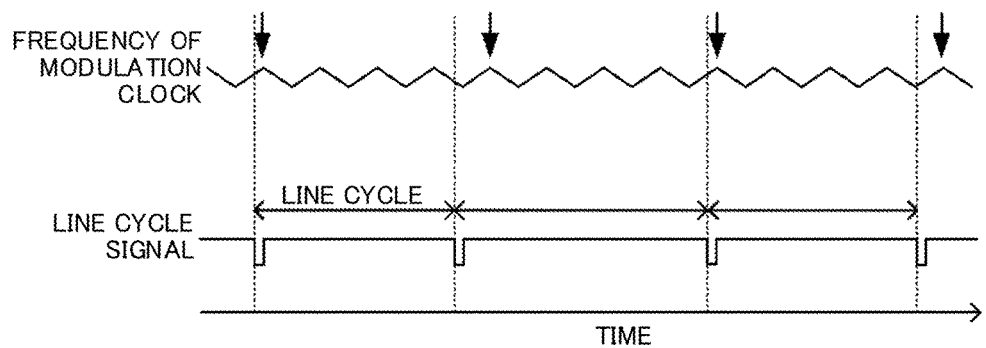
FIG. 6 is a diagram showing a relationship between the frequency of a modulation clock and a line cycle signal in the image forming apparatus according to an embodiment of the present disclosure.
Figure 7:
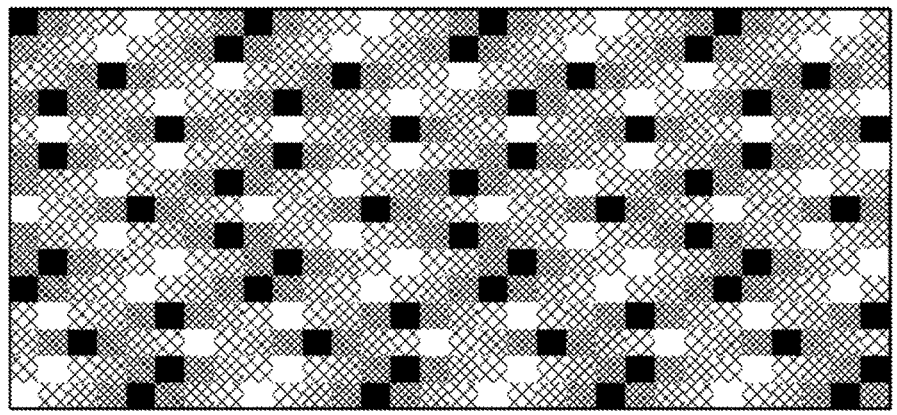
FIG. 7 is a diagram showing an example of image data in the image forming apparatus according to an embodiment of the present disclosure.

In contrast, with the image forming apparatus 1 according to the present embodiment, it is possible, by varying the line cycle from line to line, to reduce the apparent noise caused by the density variations, while maintaining the degree of freedom in setting the line cycle. When the line cycle is varied from line to line, the time period from the start of each line cycle until the appearance of the first peak of the frequency of the modulation clock varies irregularly, as shown in FIG. 6. As a result, the peak positions of the density variations on the lines become irregular, thus reducing the apparent noise caused by the density variations, as shown in FIG. 7.

A line synchronization signal generator 54 that generates the line synchronization signal on the basis of the modulation clock is included in the timing signal generator 53. The line synchronization signal generator 54 generates, on the basis of the modulation clock, a line synchronization signal (see FIG. 6) whose line cycle varies from line to line.

Figure 8:
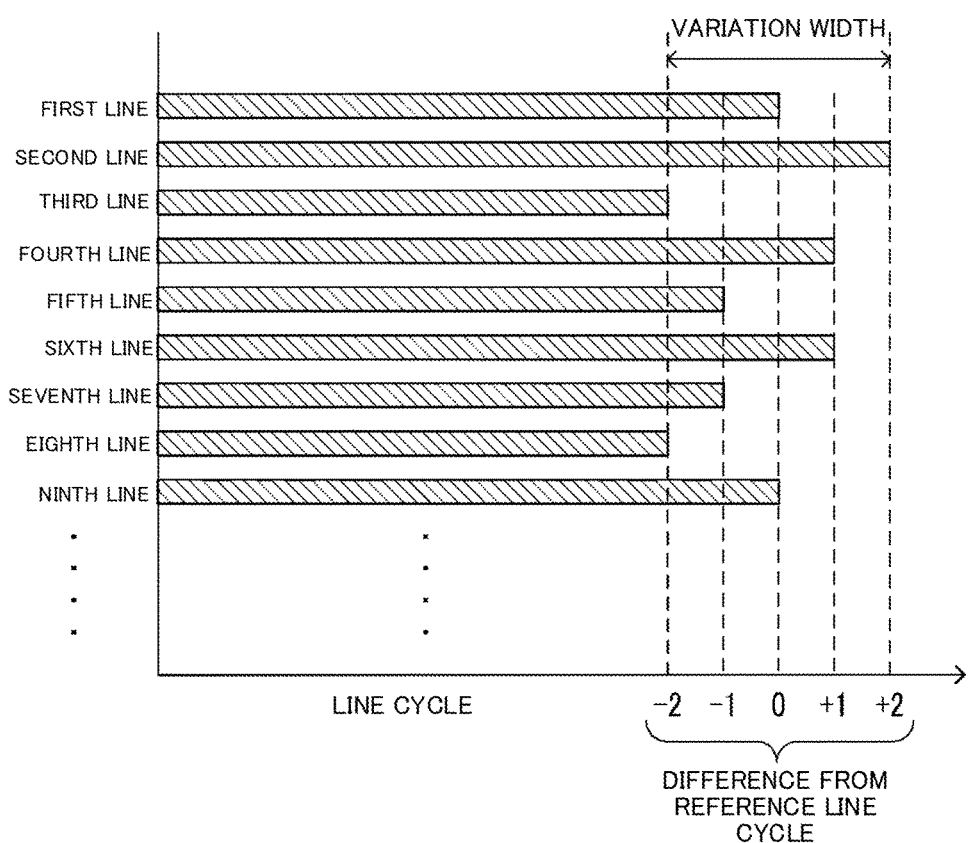
FIG. 8 is a diagram showing an example of the line cycles of lines in the image forming apparatus according to an embodiment of the present disclosure.

For example, the line synchronization signal generator 54 generates the line synchronization signal whose line cycle varies from line to line within the range of a variation width that is predetermined with respect to a reference line cycle. For example, the line synchronization signal generator 54 uses a random pattern generation circuit (not shown) to generate the line synchronization signal whose line cycle randomly varies from line to line within the range of the variation width, as shown in FIG. 8. It should be noted that the line synchronization signal generator 54 may generate, on the basis of a predetermined irregular variation pattern, the line synchronization signal whose line cycle irregularly varies from line to line within the range of a variation width that is predetermined with respect to the reference line cycle.

In the example shown in FIG. 8, the line cycle varies in five steps, namely, from −2 to +2, centered on the reference line cycle. The variation unit of the line cycle may be one pixel cycle based on the driving clock, for example. In this case, the line cycle of the second line shown in FIG. 8 is longer than the reference line cycle by two pixel cycles. The line cycle of the third line shown in FIG. 8 is shorter than the reference line cycle by two pixel cycles.

Meanwhile, when the variation width is less than or equal to the modulation cycle of the modulation clock, the larger the variation width is, the more the apparent noise caused by the density variations is reduced. However, even when the variation width is set to be larger than the modulation cycle of the modulation clock, the effect of reducing the apparent noise caused by the density variations will not be increased further. Rather, the image reading speed is reduced by the variation width. Accordingly, the variation width should be set to be an appropriate width within the range that is less than or equal to the modulation cycle of the modulation clock, by taking into consideration the required noise reduction effect and the required image reading speed. For example, when the modulation cycle of the modulation clock is 30 microseconds, the variation width of the line cycle should be less than or equal to 30 microseconds. It should be noted that when the modulation cycle of the modulation clock is variable, the variation width of the line cycle may be changed accordingly.

The line synchronization signal that has been generated by the line synchronization signal generator 54 is supplied to the line image sensor 20. Furthermore, information indicating the difference of the line cycle of each of the lines from the reference line cycle (e.g., digital data indicating any integer value in the range of −2 to +2) is outputted from the line synchronization signal generator 54, and the information is supplied to an image correction unit 56, which will be described below.

The line image sensor 20 sequentially reads an image of one line of the document at a timing corresponding to the line synchronization signal, and outputs the image data. Specifically, the line image sensor 20 converts the light reflected from the linear region of the document into an electric signal for each pixel at a timing corresponding to the line synchronization signal. Then, the line image sensor 20 sequentially outputs the electric signal (analog image data) for each pixel in accordance with the driving clock at a timing corresponding to the line synchronization signal.

The image processor 55 processes the analog image data that is outputted from the line image sensor 20, on the basis of the driving clock generated by the timing signal generator 53 on the basis of the modulation clock.

The image processor 55 includes an AFE (not shown), the image correction unit 56, and so forth. The AFE converts the analog image data outputted from line image sensor 20 into digital image data. The image correction unit 56 performs, on the digital image data that has been converted by the AFE, a correction process such as shading correction, a gamma correction process, and a sub-scanning direction correction process which is to be described below.

The sub-scanning direction correction process is a process for correcting image distortion in the sub-scanning direction in the image data, the image distortion resulting from a shift of the reading position (or the reading timing) on the document. In the sub-scanning direction correction process, the image data is corrected on the basis of the line cycle of each of the lines that varies from line to line. In the following, the sub-scanning direction correction process performed in the image correction unit 56 will be described with reference to FIGS. 9 to 11.

As described previously, the line image sensor 20 sequentially reads an image of one line of the document at a timing corresponding to the line synchronization signal, and outputs the image data. In the present embodiment, the line synchronization signal whose line cycle varies from line to line is supplied to the line image sensor 20. Accordingly, the reading position of each of the lines on the document that is read by the line image sensor 20 is not located at a fixed interval, but is shifted in the sub-scanning direction.

For example, when the line cycle of a given line is longer than the reference line cycle, the reading timing of the next line will be delayed correspondingly. As a result, the image reading interval becomes wider than a reference interval, and the image data that is outputted from the line image sensor 20 is affected such that the image is locally shrunk in the sub-scanning direction. Conversely, when the line cycle of a given line is shorter than the reference line cycle, the reading timing of the next line is advanced correspondingly. As a result, the image reading interval becomes narrower than the reference interval, and the image data that is outputted from the line image sensor 20 is affected such that the image is locally extended in the sub-scanning direction. Accordingly, to exaggerate, image data is obtained in which, for example, a straight line that should originally extend straight meanders finely.

Figure 9:
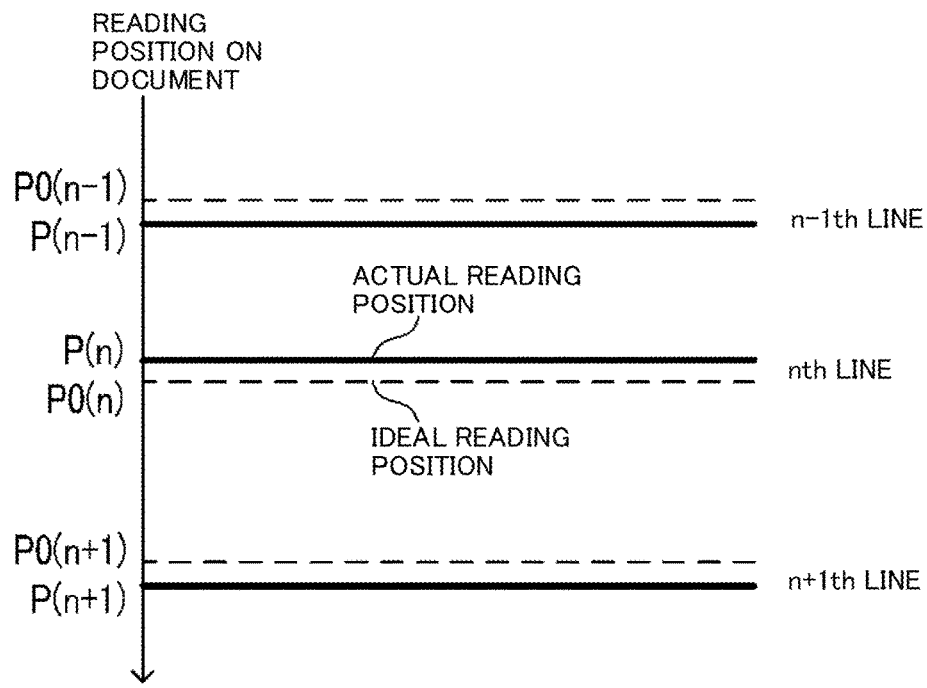
FIG. 9 is a diagram for illustrating a sub-scanning direction correction process in the image forming apparatus according to an embodiment of the present disclosure.

FIG. 9 shows an example of the ideal reading position and the actual reading position of each of three lines on a document. Although the ideal reading positions are arranged at an equal interval in the sub-scanning direction, the actual reading positions are shifted from the ideal reading positions. Such a shift in the reading position is dependent on the cumulative total of the differences between the line cycles of the lines that have been previously read and the reference line cycle.

For example, in FIG. 8, the difference (hereinafter simply referred to as "cycle difference") of the line cycle of the first line from the reference line cycle is 0, and therefore, the reading timing of the second line is a timing when the time corresponding to one reference line cycle has elapsed since the reading timing of the first line. Accordingly, the actual reading position of the second line is the ideal reading position.

Since the cycle difference of the first line is 0 and the cycle difference of the second line is +2, the reading timing of the third line is a timing when the time corresponding to two reference line cycles plus two variation units has elapsed since the reading timing of the first line. The reason is that the cumulative total of the cycle differences of the preceding lines (i.e., the sum of the cycle difference of the first line and the cycle difference of the second line) is +2. Accordingly, the actual reading position of the third line is a reading position that is delayed in time from the ideal reading position by two variation units.

Since the cycle difference of the first line is 0, the cycle difference of the second line is +2, and the cycle difference of the third line is −2, the reading timing of the fourth line is a timing when the time corresponding to exactly three reference line cycles has elapsed since the reading timing of the first line. The reason is that the cumulative total of the cycle differences of the preceding lines (i.e., the sum of the cycle differences of the first to third lines) is 0. Accordingly, the actual reading position of the fourth line is the ideal reading position.

Since the cycle difference of the first line is 0, the cycle difference of the second line is +2, the cycle difference of the third line is −2, and the cycle difference of the fourth line is +1, the reading timing of the fifth line is a timing when the time corresponding to four reference line cycles plus one variation unit has elapsed since the reading timing of the first line. The reason is that the cumulative total of the cycle differences of the preceding lines (i.e., the sum of the cycle differences of the first to fourth lines) is +1. Accordingly, the actual reading position of the fifth line is a reading position that is delayed in time from the ideal reading position by one variation unit.

Thus, the shift between the actual reading position and the ideal reading position of each line can be calculated on the basis of the cycle difference of the preceding lines. The image correction unit 56 performs the sub-scanning direction correction process on the digital image data on the basis of the information relating to the cycle difference supplied from the line synchronization signal generator 54 (i.e., on the basis of the line cycle of each of the lines that varies from line to line).

For example, the image correction unit 56 corrects image distortion in the image data in the sub-scanning direction by a linear interpolation process based on the density (image data) of a pixel of interest and the density of an adjacent pixel that is adjacent to the pixel of interest along the sub-scanning direction. More specifically, the image correction unit 56 corrects the density of a pixel of interest by weighted averaging the density of the pixel of interest and the density of at least one adjacent pixel that is adjacent to the pixel of interest in the sub-scanning direction, on the basis of the information relating to the cycle difference.

For example, when the actual reading position P(n) is smaller than the ideal reading position P0(n) (i.e., shifted to the upstream side in the sub-scanning direction relative to the ideal reading position P0(n)) as the nth line shown in FIG. 9, assuming that D(n) represents the density of a pixel of interest on the nth line and D(n+1) represents the density of a pixel on the n+1th line that is adjacent to the pixel of interest, the corrected density of the pixel of interest is calculated by the following expression:

$$D(n)\cdot(P(n+1)-P0(n))/(P(n+1)-P(n))+D(n+1)\cdot(P0(n)-P(n))/(P(n+1)-P(n))$$

Figure 10:
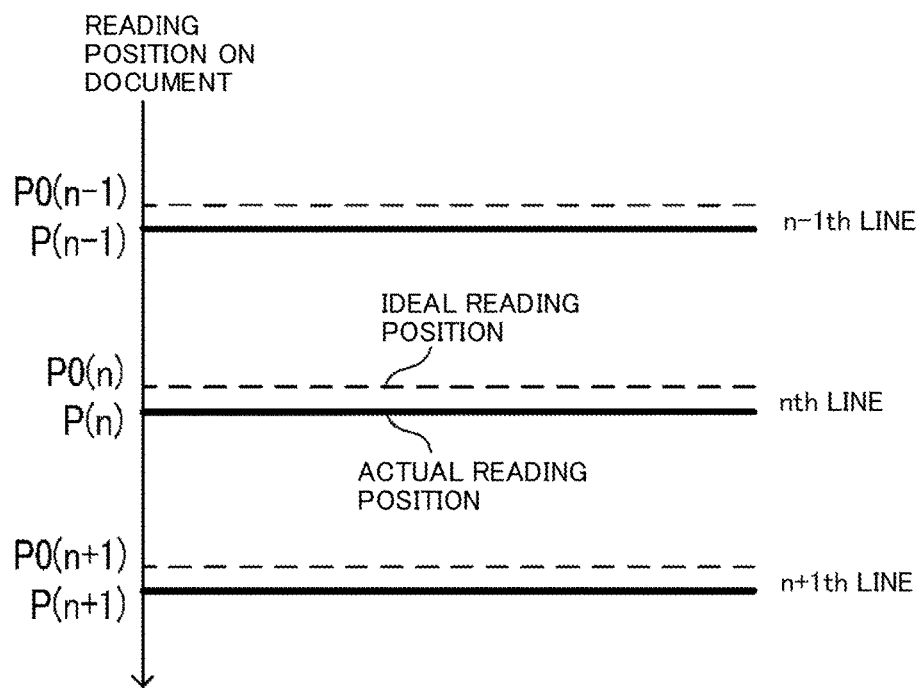
FIG. 10 is a diagram for illustrating a sub-scanning direction correction process in the image forming apparatus according to an embodiment of the present disclosure.

On the other hand, when the actual reading position P(n) is larger than the ideal reading position P0(n) (i.e., shifted to the downstream side in the sub-scanning direction relative to the ideal reading position P0(n)) as the nth line shown in FIG. 10, assuming that D(n) represents the density of a pixel of interest on the nth line and D(n−1) represents the density of a pixel on the n−1th line that is adjacent to the pixel of interest, the density of the corrected pixel of interest is calculated by the following expression:

$$D(n-1)\cdot(P(n)-P0(n))/(P(n)-P(n-1))+D(n)\cdot(P0(n)-P(n-1))/(P(n)-P(n-1))$$

The effect of the above-described sub-scanning direction correction process will be described specifically with reference to FIG. 11, taking, as an example, a portion where the boundary between a white region and a black region is inclined at 45 degrees on the document.

Figure 11:
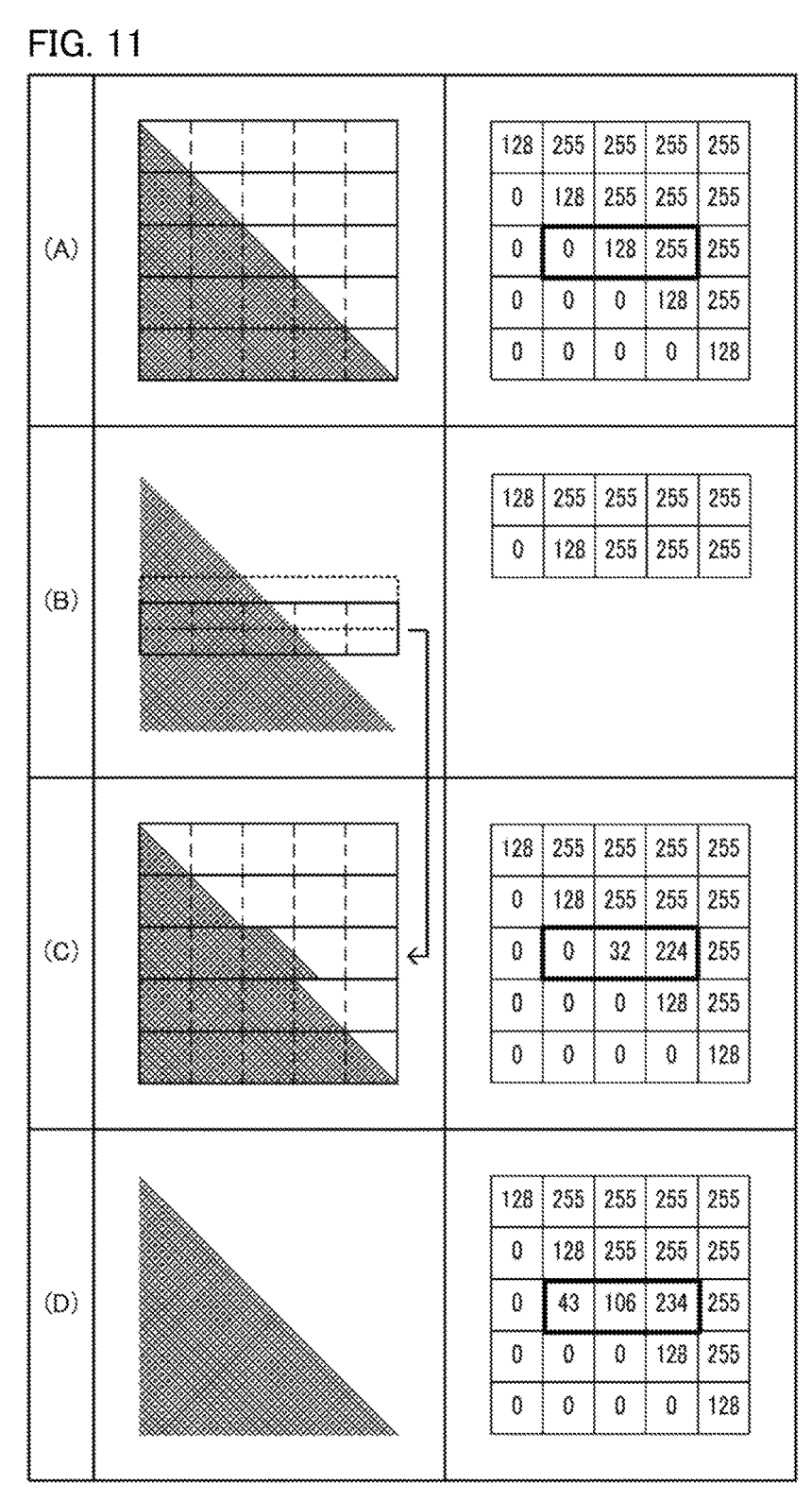

For example, when the line cycle is constant, digital image data as shown in the right column of (A) in FIG. 11 is obtained by reading a document as shown in the left column of (A) in FIG. 11.

Meanwhile, in FIG. 11, when the line cycle of the second line from the top is longer than the reference line cycle, for example, 1.5 times the reference line cycle, the reading timing of the third line from the top, which is the next line, is delayed correspondingly, and the reading position of the third line is shifted by a ½ line to the downstream side in the sub-scanning direction as shown on the left column of (B) in FIG. 11. As a result, digital image data as shown in the right column of (C) in FIG. 11, or in other words, image data similar to that obtained when reading a document as shown in the left column of (C) in FIG. 11 is read is obtained.

Here, when the three middle pixels in the third line from the top are focused on, the pixel values of the two pixels from the right in (C) in FIG. 11 have decreased, as compared to the corresponding pixels in (A) in FIG. 11. As a result, in the digital image data in the right column of (C) in FIG. 11, it appears that the boundary between the white region and the black region has moved to the right. That is, the boundary that should be originally straight appears distorted.

On the other hand, when the linear interpolation process shown in FIG. 10 is performed by the image correction unit 56 on the digital image data in the right column of (C) in FIG. 11, digital image data as shown in the right column of (D) in FIG. 11 is obtained as the corrected digital image data. Here, when the three middle pixels in the third line from the top are focused on, the pixel value of each of the three pixels is slightly different between (A) in FIG. 11 and (D) in FIG. 11. However, the total of the pixel values of these three pixels is the same, namely, 383, both in (A) in FIG. 11 and (D) in FIG. 11. Accordingly, although the boundary between the white region and the black region on the third line from the top becomes slightly blurred in the digital image data in the right column of (D) in FIG. 11, the boundary between the white region and the black region appears straight as shown in the left column of (D) in FIG. 11.

It should be noted that the sub-scanning direction correction process performed by the image correction unit 56 is not limited to the above-described correction method, and a simpler correction method may be used. Furthermore, when the image distortion in the sub-scanning direction in the image data is within an allowable range, the sub-scanning direction correction process itself may be omitted.

The digital image data that has been corrected by the image correction unit 56 is stored in a storage unit (not shown), and is subsequently used for an image forming process performed by the image forming unit 3, for example.

As described above, with the image forming apparatus 1 according to the present embodiment, it is possible, by varying the line cycle from line to line, to reduce the apparent noise caused by the density variation, while maintaining the degree of freedom in setting the line cycle.

It should be noted that the present disclosure is not limited to the image forming apparatus 1, and is applicable to any image processing device having the function of reading an image from a document by using the line image sensor 20. For example, the present disclosure is applicable to a copier, as well as a printer, a facsimile, a multifunction peripheral, and the like having the function of a copier.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing device comprising:
a modulation clock generator configured to generate a modulation clock by modulating a frequency of a reference clock at a predetermined modulation cycle;
a line synchronization signal generator configured to generate, on the basis of the modulation clock, a line synchronization signal whose line cycle varies from line to line;
a line image sensor configured to sequentially read an image of one line of a document at a timing corresponding to the line synchronization signal and to output image data; and
an image processor configured to process the image data on the basis of the modulation clock.

2. The image processing device according to claim 1, wherein the line synchronization signal generator is configured to generate the line synchronization signal whose line cycle varies from line to line within a range of a variation width that is predetermined with respect to a reference line cycle.

3. The image processing device according to claim 2, wherein the variation width is determined so as to be less than or equal to the modulation cycle of the modulation clock.

4. The image processing device according to claim 2, wherein the line synchronization signal generator is configured to generate the line synchronization signal whose line cycle randomly varies from line to line within the range of the variation width.

5. The image processing device according to claim 1, wherein the image processor includes an image correction unit configured to correct the image data on the basis of the line cycle of each of the lines that varies from line to line.

6. The image processing device according to claim 5, wherein the image correction unit is configured to correct image data of a pixel of interest by weighted averaging the image data of the pixel of interest and pixel data of at least one adjacent pixel that is adjacent to the pixel of interest in the sub-scanning direction, on the basis of the line cycle of each of the lines that varies from line to line.

7. An image forming apparatus comprising:
the image processing device according to claim 1; and
an image forming unit configured to form an image on a sheet on the basis of the image data that is processed by the image processor.

* * * * *